US009639045B2

(12) United States Patent
Okuzono et al.

(10) Patent No.: US 9,639,045 B2
(45) Date of Patent: May 2, 2017

(54) IMAGE FORMING APPARATUS THAT SHIFTS TO STATE WHERE QUICK ACTIVATION IS POSSIBLE, METHOD OF CONTROLLING THE SAME, AND STORAGE MEDIUM

(75) Inventors: Ryotaro Okuzono, Kawasaki (JP); Kenji Hara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/495,464

(22) Filed: Jun. 13, 2012

(65) Prior Publication Data

US 2012/0320402 A1 Dec. 20, 2012

(30) Foreign Application Priority Data

Jun. 16, 2011 (JP) ................................ 2011-134302
Jan. 30, 2012 (JP) ................................ 2012-016616

(51) Int. Cl.
*G06K 15/00* (2006.01)
*G03G 15/00* (2006.01)

(52) U.S. Cl.
CPC ................................ *G03G 15/5004* (2013.01)

(58) Field of Classification Search
CPC ................................................ G03G 15/5004
See application file for complete search history.

(56) References Cited

U.S. PATENT DOCUMENTS

| | | | | |
|---|---|---|---|---|
| 2005/0012776 | A1* | 1/2005 | Kato | B41J 2/165 347/23 |
| 2007/0216720 | A1* | 9/2007 | Akase | 347/22 |
| 2007/0234093 | A1 | 10/2007 | Kimura et al. | |
| 2007/0279678 | A1* | 12/2007 | Kobayashi | 358/1.15 |

(Continued)

FOREIGN PATENT DOCUMENTS

| | | | |
|---|---|---|---|
| CN | 101131606 | A | 2/2008 |
| JP | 2000322160 | A | 11/2000 |

(Continued)

OTHER PUBLICATIONS

Korean Office Action issued in Counterpart Korean Patent Application No. 10-2012-0064352, dated Jun. 16, 2014.

(Continued)

*Primary Examiner* — Idowu O Osifade
(74) *Attorney, Agent, or Firm* — Rossi, Kimms & McDowell LLP

(57) ABSTRACT

An image forming apparatus capable of shifting to a state where quick activation thereof can be performed in a shorter time period when a power switch is turned off. When the off operation of the power switch is detected, a first state is stored, and when the on operation of the power switch is detected next, the state of the image forming apparatus is shifted to a second state from which the image forming apparatus can return to the first state. When the state of the image forming apparatus is shifted to the second state, time starts to be measured. When the on operation of the power switch is detected in the second state, the value of the (Continued)

measured time is acquired. The image forming apparatus is caused to return to the stored first state depending on the value of the measured time.

18 Claims, 6 Drawing Sheets

(56) References Cited

U.S. PATENT DOCUMENTS

| | | | | |
|---|---|---|---|---|
| 2009/0276650 | A1* | 11/2009 | Kuroda | G03G 15/5004 713/320 |
| 2010/0118331 | A1* | 5/2010 | Murata | 358/1.15 |
| 2010/0165806 | A1* | 7/2010 | Mikami et al. | 369/47.5 |
| 2010/0166448 | A1* | 7/2010 | Mikami | 399/88 |
| 2011/0083027 | A1* | 4/2011 | Takagi | 713/323 |
| 2012/0320402 | A1 | 12/2012 | Okuzono et al. | |

FOREIGN PATENT DOCUMENTS

| | | | |
|---|---|---|---|
| JP | 2006259591 | A | 9/2006 |
| JP | 2007243547 | A | 9/2007 |
| JP | 2007-293806 | A | 11/2007 |
| JP | 2011-098561 | A | 5/2011 |
| JP | 2013020606 | A | 1/2013 |
| KR | 1020050050222 | A | 5/2005 |
| KR | 1020070037967 | A | 4/2007 |

OTHER PUBLICATIONS

Notice on the First Office Action issued in Chinese Patent Application No. 201210198776.X dated Oct. 10, 2014. English translation provided.

Korean Office Action issued in counterpart application No. KR10-2012-0064352, dated Mar. 26, 2015.

Office Action issued in Japanese Patent Application No. 2015257270, mailed Nov. 22, 2016.

* cited by examiner

IMAGE FORMING APPARATUS THAT SHIFTS TO STATE WHERE QUICK ACTIVATION IS POSSIBLE, METHOD OF CONTROLLING THE SAME, AND STORAGE MEDIUM

BACKGROUND OF THE INVENTION

Field of the Invention

The present invention relates to an image forming apparatus, a method of controlling the image forming apparatus, and a storage medium, and more particularly to an image forming apparatus that shifts to a state where quick activation of the apparatus is possible when a power switch is turned off, a method of controlling the image forming apparatus, and a storage medium.

Description of the Related Art

Recent image forming apparatuses and image processing apparatuses suffer from a problem that it takes a long time before becoming capable of being actually operated after having a power switch thereof operated by a user since the apparatuses have come to be equipped with multiple functions.

To solve this problem, there has been proposed an image forming apparatus having a function called “suspend” (suspend mode) which, when the user turns off the power switch, suspends operations of programs and the like being executed such that the apparatus can return to the same operating state as the current operating state.

Further, there has also been proposed an image forming apparatus having a function called “resume” which, when the user turns on the power switch, starts the apparatus in an operating state in which the apparatus was immediately before the preceding shutdown, that is, causes the apparatus to return to a state immediately before the shutdown.

According to the above-described suspend function, the image forming apparatus in a normal operation mode can shift to the suspend mode in which the operations of the respective sections of the image forming apparatus are suspended with the states of the sections immediately before the suspension being held.

Further, according to the above-described resume function, the image forming apparatus in the suspend mode can return to the normal operation mode in a state immediately before shifting to the suspend mode.

That is, by using the functions as described above, the image forming apparatus, such as a digital multifunction peripheral, can achieve quick activation, to quickly return to a state of operation immediately before the shutdown.

If the suspend mode is used for an off operation of the power switch, when the image forming apparatus cannot perform a normal operation suddenly due to a memory leak, an invalid operation process, or the like, the off operation of the power switch cannot cause the image forming apparatus to go through restart processing, which makes it impossible for the image forming apparatus to return from the normal operation disabled state.

To cope with this inconvenience, there has been proposed a method in which when the power switch is turned off, an operating system (OS) of the image forming apparatus is shut down once, and then is restarted to enter the suspend mode (see Japanese Patent Laid-Open Publication No. 2007-293806).

With this method, since the OS is restarted, it is possible to clean up the memory and shift to the suspend mode in a state in which the normal operation disabled state e.g. due to a memory leak is cleared.

However, in the case where the image forming apparatus is configured to restart the OS after executing shutdown thereof, when the power switch is turned off, the shutdown operation and the restart operation take place whenever the power switch is turned off, which causes a problem of increasing time required to shift to the suspend mode.

SUMMARY OF THE INVENTION

The present invention provides an image forming apparatus capable of shifting to a state from which the image forming apparatus can achieve quick activation in a shorter time period when a power switch is turned off, a method of controlling the image forming apparatus, and a storage medium.

In a first aspect of the present invention, there is provided an image forming apparatus including a power switch that can be subjected by a user to an on operation or an off operation for turning on or off a power supply, comprising a shift unit configured to store a first state of the image forming apparatus obtained when the off operation of the power switch is detected, upon detection of the off operation of the power switch, and shift a state of the image forming apparatus to a second state from which when the on operation of the power switch is detected next, the image forming apparatus can return to the first state, a timer unit configured to start measuring time upon shifting of the state of the image forming apparatus to the second state by the shift unit, an acquisition unit configured to acquire a value of the time measured by the timer unit when the on operation of the power switch is detected in the second state, and an activation control unit to cause the image forming apparatus to return to the first state depending on the value of the measured time acquired by the acquisition unit.

In a second aspect of the present invention, there is provided an image forming apparatus including a power switch that can be subjected by a user to an on operation or an off operation for turning on or off a power supply, comprising a first timer value-acquiring unit configured to acquire a current timer value as a first timer value upon detection of the off operation of the power switch, a shift unit configured to store a first state of the image forming apparatus obtained when the off operation of the power switch is detected, upon acquisition of the first timer value by the first timer value-acquiring unit, and shift a state of the image forming apparatus to a second state from which when the on operation of the power switch is detected next, the image forming apparatus can return to the first state, a second timer value-acquiring unit configured to acquire a current timer value as a second timer value after detection of the on operation of the power switch and upon returning of the state of the image forming apparatus from the second state to the first state, and a restart unit configured to restart the image forming apparatus depending on the first timer value acquired by the first timer value-acquiring unit and the second timer value acquired by the second timer value-acquiring unit.

In a third aspect of the present invention, there is provided an image forming apparatus including a power switch that can be subjected by a user to an on operation or an off operation for turning on or off a power supply, comprising a measurement unit configured to measure time elapsed after detection of the off operation of the power switch until detection of an on operation of the power switch, and a restart unit configured to restart the image forming apparatus when the time measured by the measurement unit is not longer than a predetermined time period.

In a fourth aspect of the present invention, there is provided a method of controlling an image forming apparatus including a power switch that can be subjected by a user to an on operation or an off operation for turning on or off a power supply, comprising storing a first state of the image forming apparatus obtained when the off operation of the power switch is detected, upon detection of the off operation of the power switch, and shifting a state of the image forming apparatus to a second state from which when the on operation of the power switch is detected next, the image forming apparatus can return to the first state, starting measuring time upon shifting of the state of the image forming apparatus to the second state, acquiring a value of the measured time when the on operation of the power switch is detected in the second state, and restarting the image forming apparatus or causing the image forming apparatus to return to the first state depending on the value of the acquired measured time.

In a fifth aspect of the present invention, a method of controlling an image forming apparatus including a power switch that can be subjected by a user to an on operation or an off operation for turning on or off a power supply, comprising acquiring a current timer value as a first timer value upon detection of the off operation of the power switch, storing a first state of the image forming apparatus obtained when the off operation of the power switch is detected, upon acquisition of the first timer value, and shifting a state of the image forming apparatus to a second state from which when the on operation of the power switch is detected next, the image forming apparatus can return to the first state, acquiring a current timer value as a second timer value after detection of the on operation of the power switch and upon returning of the state of the image forming apparatus from the second state to the first state, and restarting the image forming apparatus depending on the first timer value and the second timer value.

In a sixth aspect of the present invention, there is provided a non-transitory computer-readable storage medium storing a computer-executable program for causing a computer to execute a method of controlling an image forming apparatus including a power switch that can be subjected by a user to an on operation or an off operation for turning on or off a power supply, wherein the method comprises storing a first state of the image forming apparatus obtained when the off operation of the power switch is detected, upon detection of the off operation of the power switch, and shifting a state of the image forming apparatus to a second state from which when the on operation of the power switch is detected next, the image forming apparatus can return to the first state, starting measuring time upon shifting of the state of the image forming apparatus to the second state, acquiring a value of the measured time when the on operation of the power switch is detected in the second state, and restarting the image forming apparatus or causing the image forming apparatus to return to the first state depending on the value of the acquired measured time.

In a seventh aspect of the present invention, there is provided a non-transitory computer-readable storage medium storing a computer-executable program for causing a computer to execute a method of controlling an image forming apparatus including a power switch that can be subjected by a user to an on operation or an off operation for turning on or off a power supply, wherein the method comprises acquiring a current timer value as a first timer value upon detection of the off operation of the power switch, storing a first state of the image forming apparatus obtained when the off operation of the power switch is detected, upon acquisition of the first timer value, and shifting a state of the image forming apparatus to a second state from which when the on operation of the power switch is detected next, the image forming apparatus can return to the first state, acquiring a current timer value as a second timer value after detection of the on operation of the power switch and upon returning of the state of the image forming apparatus from the second state to the first state, and restarting the image forming apparatus depending on the first timer value and the second timer value.

According to the present invention, it is possible to provide an image forming apparatus capable of shifting to a state from which the image forming apparatus can achieve quick activation in a shorter time period when the power switch is turned off, a method of controlling the image forming apparatus, and a storage medium.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
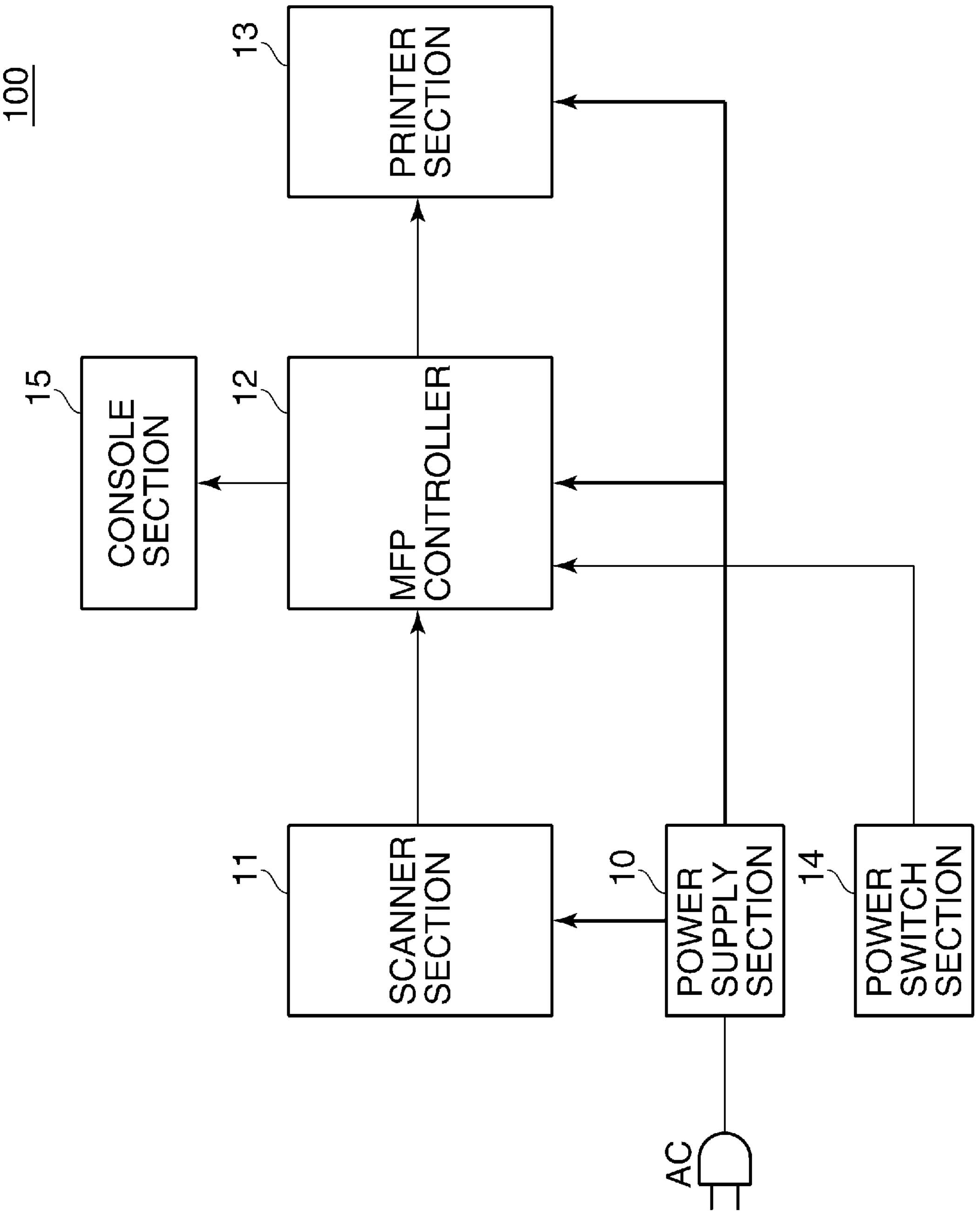
FIG. 1 is a schematic block diagram of an image forming apparatus according to an embodiment of the present invention.

FIG. 1 is a schematic block diagram of an image forming apparatus (hereinafter referred to as the "MFP (multifunction peripheral)") 100 according to an embodiment of the present invention.

The MFP 100 is equipped with multiple functions, such as a copy function, a printer function, a scanner function, and so forth.

Referring to FIG. 1, an MFP controller 12 controls the overall operation of the MFP 100. A printer section 13 performs image processing e.g. by electrophotography. A scanner section 11 optically reads an image from an original, and converts the read image to a digital image.

A power supply section 10 supplies power to each controller. A console section 15 operates the MFP 100. A power switch section 14 can be used by a user for power on/off operation, and controls the power supply state of the MFP 100.

With the above-described arrangement, the MFP having the copy function, the printer function, the scanner function, and so forth is constructed. Note that the recording method of the printer section 13 is not limited to an electrophotographic method, but another recording method, such as an inkjet method or a thermal transfer method, may be employed insofar as it is capable of performing image processing on both sides of a sheet-like recording medium (recording sheet, for example).

Figure 2:
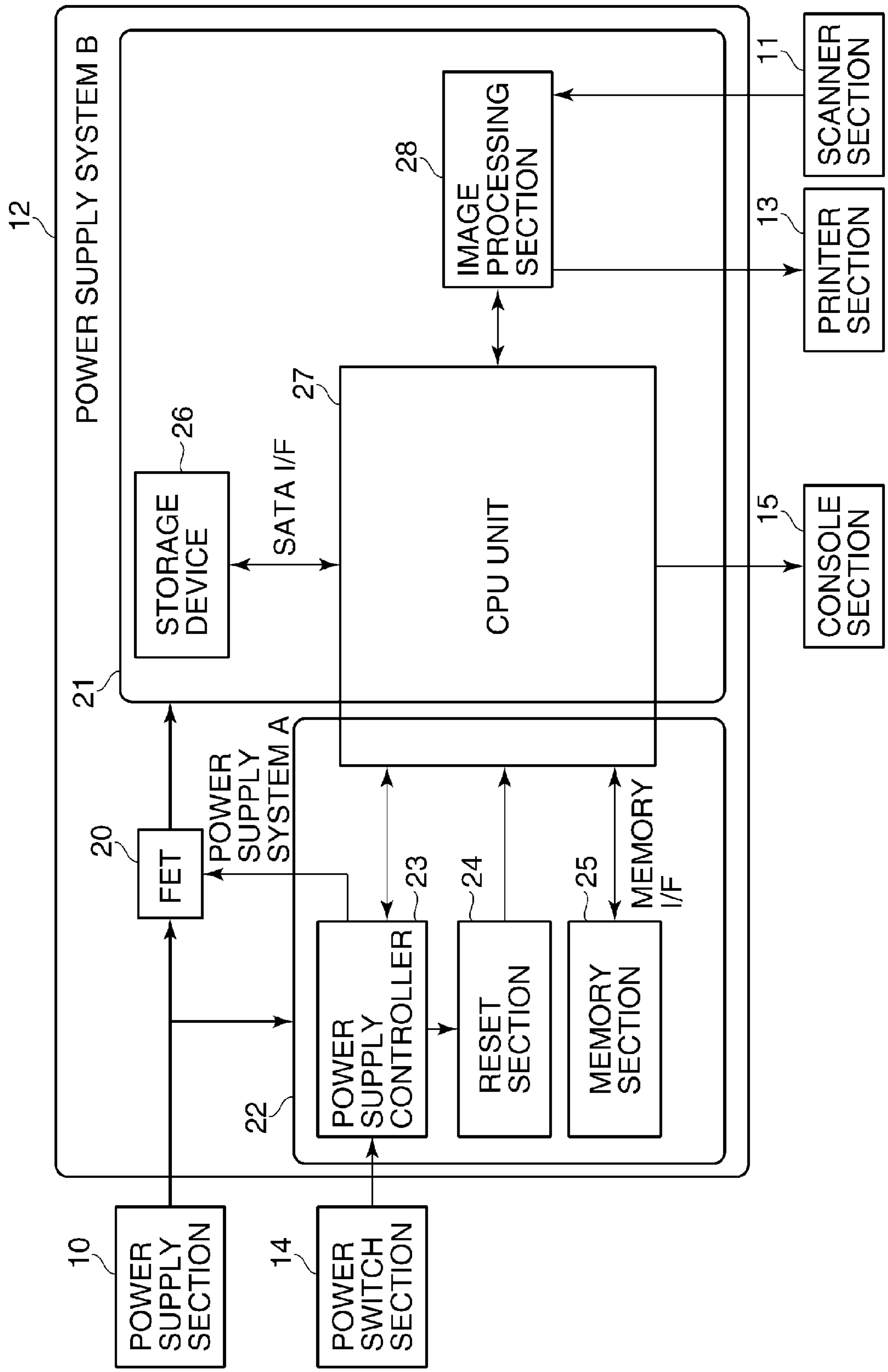
FIG. 2 is a schematic block diagram of an MFP controller appearing in FIG. 1.

FIG. 2 is a schematic block diagram of the MFP controller 12 appearing in FIG. 1. Note that in the following, description of the components already described with reference to FIG. 1 is omitted.

Referring to FIG. 2, a power supply controller 23 has a function of notifying a CPU unit 27 that the power switch section 14 has been turned on or off, as an interrupt. Further, the power supply controller 23 performs control operations, such as an operation for shutting down power supplied to each controller when the operation mode of the MFP 100 shifts to a power saving mode, and an operation for supplying power to each controller when the operation mode returns from the power saving mode.

A reset section 24 is a reset controller which issues a reset to the CPU unit 27 and the entire system based on a control signal from the power supply controller 23, and causes the CPU unit 27 to execute restart processing. An FET (field effect transistor) 20 is a switch for turning on and off power supply to a power supply system B 21.

The CPU unit 27 controls the overall operation of the MFP 100. A memory section 25 is a volatile memory, such as a DDR SDRAM (double-data-rate synchronous dynamic random access memory).

An image processing section 28 is a controller which performs processing, such as compression of data from the scanner section 11, and delivery of image data processed by the CPU unit 27 to the printer section 13. A storage device 26 is an external storage device, such as a hard disk drive (HDD).

Next, a description will be given of the power supply system of the MFP controller 12. Note that although in the present embodiment, a suspend method in which data is stored in the memory is applied to placing the MFP 100 in a state where power consumption is lower than in a normal state and quick activation can be achieved, any other suitable method, such as a hibernation method, may be employed. As described above, when the off operation of the power switch section 14 is detected, the MFP 100 stores a first state of the MFP 100 at the time of detection of the off operation. Then, the MFP 100 shifts its state to a second state from which the MFP 100 can return to the first state when the on operation of the power switch section 14 is detected next. Therefore, in the present embodiment, the first state is the normal state, and the second state is a suspended state. Further, the amount of power consumption of the MFP 100 in the suspended state is smaller than the amount of power consumption of the MFP 100 in the normal state, as described hereinabove.

A power supply system A 22 supplies power to the power supply controller 23, the reset section 24, the memory section 25, and part of the CPU unit 27. Power supplied to the power supply system A 22 is not shut down in any power saving mode so as to realize the management of the power supply state of the entire MFP 100 and the return of the operation mode of MFP 100 from the power saving mode.

The power supply system B 21 supplies power to the CPU unit 27, the image processing section 28, the storage device 26, and so forth. Note that control of the shutdown and supply of power by the power supply system B 21 is realized by controlling the FET 20 via a control signal delivered from the power supply controller 23.

Figure 3:
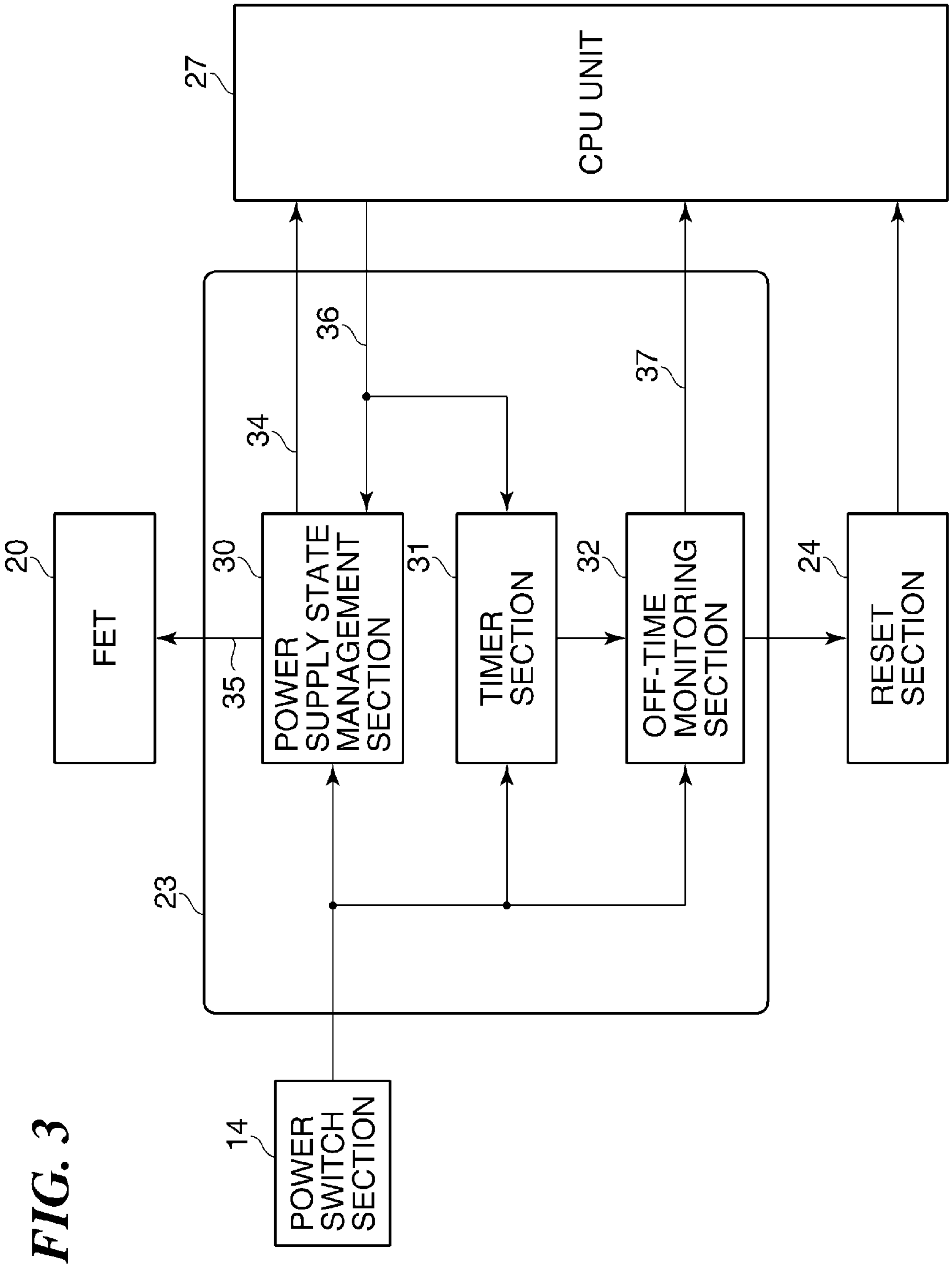
FIG. 3 is a schematic block diagram of a power supply controller appearing in FIG. 2.

FIG. 3 is a schematic block diagram of the power supply controller 23 appearing in FIG. 2.

Referring to FIG. 3, a power supply state management section 30 detects the off operation of the power switch section 14 to notify the CPU unit 27 of a state of the power switch section 14 by an interrupt signal 34.

When notified of the state of the power switch section 14 by the interrupt signal 34, the CPU unit 27 executes processing for shifting to the suspended state, which is a state where the power consumption of the MFP 100 is lower than in the normal state and quick activation can be performed (hereinafter referred to as the "shift-to-suspended state processing").

After termination of the shift-to-suspended state processing, the CPU unit 27 notifies the power supply controller 23 of the termination of the shift-to-suspended state processing by a suspend processing termination signal 36.

Upon receipt of the suspend processing termination signal 36, the power supply state management section 30 controls the FET 20 by an FET control signal 35 to cut off the supply of power to the power supply system B 21. On the other hand, upon detection of the on operation of the power switch section 14, the power supply state management section 30 controls the FET 20 by the FET control signal 35, to start the supply of power to the power supply system B 21.

A timer section 31 starts measuring time from a time point at which the shift-to-suspended state processing is terminated after the off operation of the power switch section 14. An off-time monitoring section 32 measures the off-time period of the power switch section 14, and acquires a timer value of the timer section 31 when the power switch section 14 is turned on so as to cause the MFP 100 to return from the suspended state.

When the acquired timer value is smaller than a threshold value, the off-time monitoring section 32 determines that the MFP 100 has become incapable of performing a normal operation, and the user has operated the power switch section 14 in order to restart the MFP 100.

Then, the off-time monitoring section 32 issues a system reset to the hardware including the CPU unit 27 via the reset section 24, to cause the CPU unit 27 to shift to the restart processing.

On the other hand, when the acquired timer value is larger than the threshold value, the off-time monitoring section 32 determines that it is not necessary to perform the restart processing, and notifies the CPU unit 27 by a resume signal 37 that the power switch section 14 has been turned on.

Upon receipt of the resume signal 37, the CPU unit 27 executes resume processing for causing the MFP 100 to return from the suspended state, and causes the MFP 100 to return to the normal state.

Figure 4:
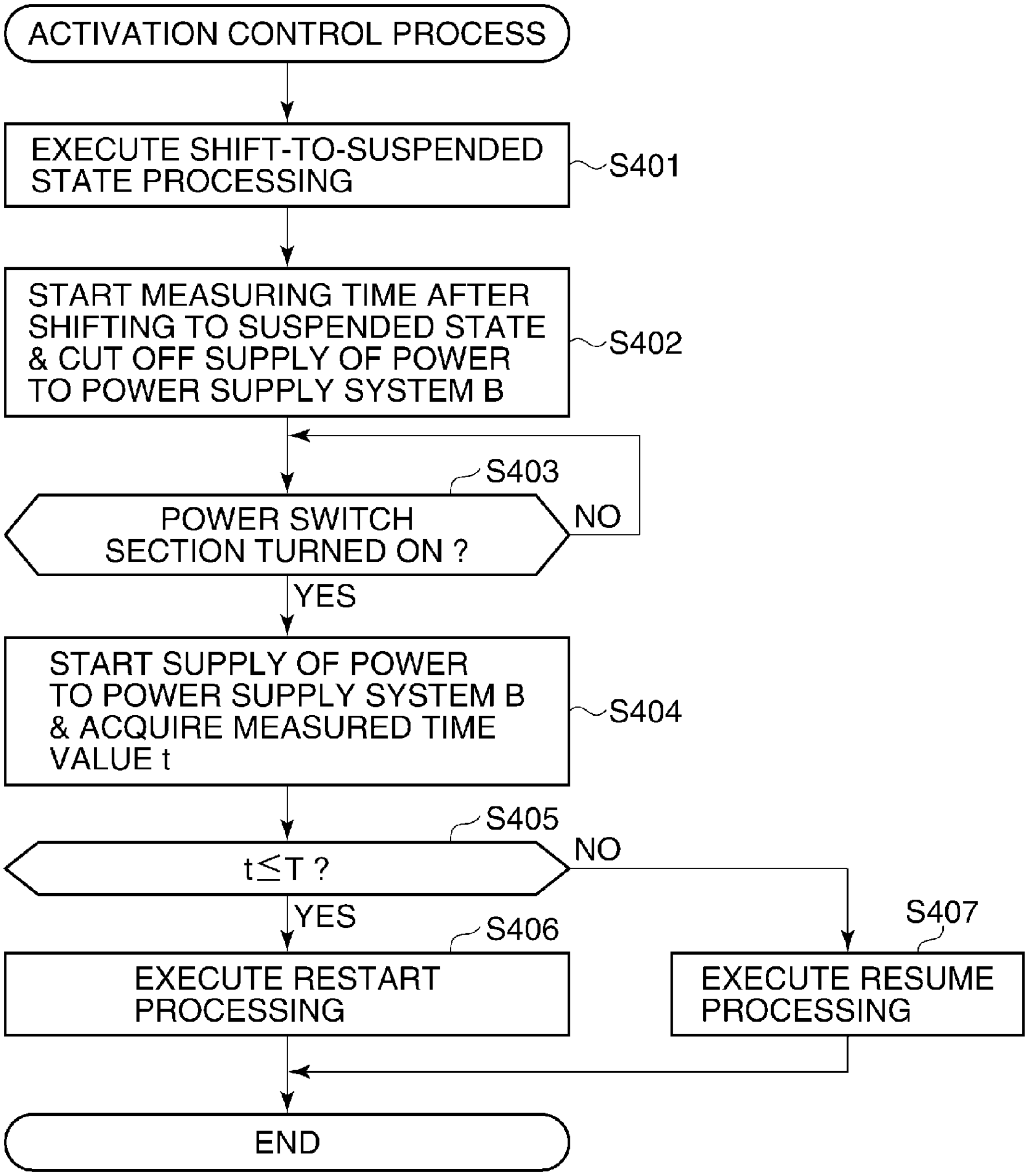
FIG. 4 is a flowchart of an activation control process executed by the MFP controller appearing in FIG. 1.

FIG. 4 is a flowchart of an activation control process executed by the MFP controller 12 appearing in FIG. 1.

Referring to FIG. 4, upon detection of the off operation of the power switch section 14 performed by the user, the power supply controller 23 sends the interrupt signal 34 to the CPU unit 27. The CPU unit 27 receives the interrupt signal 34, and executes the shift-to-suspended state processing (step S401). This step S401 corresponds to the operation of a shift unit.

After having shifted to the suspended state, the CPU unit 27 sends the suspend processing termination signal 36 to the power supply controller 23. Upon receipt of the suspend processing termination signal 36, the power supply controller 23 cuts off the supply of power to the power supply system B 21 to shift to the suspended state, and at the same time the timer section 31 starts measuring time (step S402). This step S402 corresponds to the operation of a timer unit.

Upon detecting that the power switch section 14 has been turned on (YES to a step S403), the power supply controller 23 starts the supply of power to the power supply system B 21, and acquires a measured time value t (step S404). This step S404 corresponds to the operation of an acquisition unit.

Then, the power supply controller 23 determines whether or not the measured time value t is not larger than a value T corresponding to a predetermined time period T (step S405). If it is determined in the step S405 that the measured time value t≤the value T holds (YES to the step S405), the power supply controller 23 issues the system reset via the reset section 24, and the CPU unit 27 executes the restart processing (step S406), followed by terminating the present process. After termination of the restart processing, the MFP 100 returns to the normal state.

On the other hand, if it is determined in the step S405 that the measured time value t>the value T period holds (NO to the step S405), the power supply controller 23 sends the resume signal to the CPU unit 27 37, and the CPU unit 27 executes the resume processing (step S407), followed by terminating the present process. After termination of the resume processing, the MFP 100 returns to the normal state. The above-described steps S405 to S407 correspond to the operation of a start control unit.

The above-mentioned predetermined time period is a time period it takes for the MFP 100 to become capable of operating in a normal operating state when the MFP 100 is caused to return from the suspended state to the normal state.

The value T corresponding to the predetermined time period is different on an apparatus basis depending on various conditions, such as the hardware configuration and the software configuration of the MFP 100. Therefore, a time period it takes for the MFP 100 to become capable of operating in the normal operating state is empirically determined in advance e.g. by experiment, and the value T corresponding to the predetermined time period is set using the empirically determined time period.

According to the activation control process shown in FIG. 4, the MFP 100 is restarted or is caused to return to the stored normal state depending on the acquired measured time value t. Specifically, when the measured time value t is not larger than the value T corresponding to the predetermined time period, the MFP 100 is restarted and caused to return to the stored normal state.

As a consequence, when the off operation of the power switch section 14 is performed, the MFP 100 can be shifted to a state from which quick activation can be performed in a shorter time period than in cases where restart is always performed.

In the above-described first embodiment, dedicated intelligent hardware, such as the timer section 31 and the off-time monitoring section 32, is required to be mounted on the power supply controller 23 illustrated in FIG. 3. A second embodiment, described hereafter, makes it possible to obtain the same advantageous effects as provided by the first embodiment by using software in place of the above hardware. Therefore, the second embodiment is distinguished from the first embodiment in the constructions of a power supply controller 23', a power supply system A 22', and a CPU unit 27', which correspond to the power supply controller 23, the power supply system A 22, and the CPU unit 27, respectively, and hence in the following, a description will be given of only different points from the first embodiment, and components identical to those of the first embodiment are denoted by identical reference numerals, and description thereof is omitted.

Figure 5:
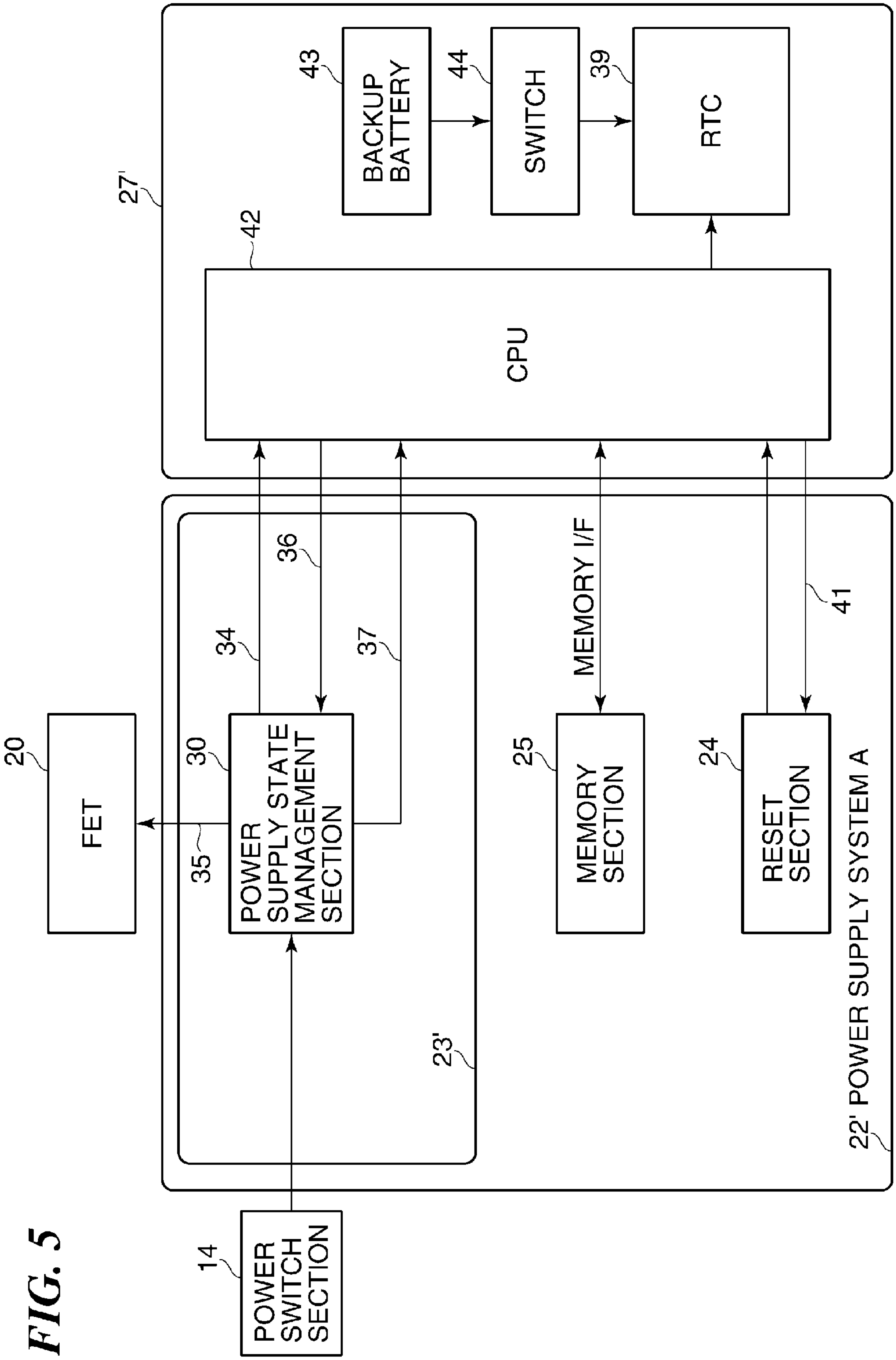
FIG. 5 is a schematic block diagram of a power supply controller and a CPU unit of an image forming apparatus according to a second embodiment of the present invention.

FIG. 5 is a schematic block diagram of the power supply controller 23' and the CPU unit 27' of the image forming apparatus (MFP) 100 according to the second embodiment.

FIG. 5 is distinguished from FIG. 3 in that the timer section 31 and the off-time monitoring section 32 appearing in FIG. 3 are eliminated, and the power supply controller 23' is formed only by the power supply state management section 30. Further, the reset section 24 is configured to exchange information only with the CPU unit 27'.

Furthermore, the CPU unit 27' includes a CPU 42, a backup battery 43, a switch 44, and a RTC 39.

Referring to FIG. 5, the power supply state management section 30 detects the off operation of the power switch section 14, and notifies the CPU 42 of the state of the power switch section 14 by the interrupt signal 34.

When notified of the state of the power switch section 14 by the interrupt signal 34, the CPU 42 executes the processing for shifting to the suspended state, which is the state where the power consumption is lower than in the normal state and quick activation can be performed (shift-to-suspended state processing).

After termination of the shift-to-suspended state processing, the CPU 42 notifies the power supply controller 23' of the termination of the shift-to-suspended state processing by the suspend processing termination signal 36.

When notified of the suspend processing termination signal 36, the power supply state management section 30 controls the FET 20 by the FET control signal 35, and cuts off the supply of power to the power supply system B 21, while continuing the supply of power to the power supply system A 22'.

The second embodiment employs the suspend method, and is configured such that the memory section 25 is on standby while storing values in a power saving state since the memory section 25 is included in the power supply system A 22'. More specifically. The second embodiment employs a suspend technology which stores the last state of operation of the CPU 42 in the memory section 25, and makes it possible to quickly activate the MFP 100 by causing the CPU 42 to return to the last state during the resume processing.

Further, the RTC 39 is a calendar IC called a real time clock, which has current calendar information, i.e. information of the current year, month, day, hour, minute, second, and day of the week in a register. This IC has a function of updating the calendar information as long as it is energized. The RTC 39 is provided on the CPU unit 27' so as to realize the clock function.

Therefore, when the switch 44 detects cut-off of supply of power to the power supply system B 21, i.e. a voltage drop of the RTC 39 or its vicinity of the CPU unit 27', it is possible to switch a voltage supplied to the RTC 39 to a voltage supplied from the backup battery 43. In short, even when the supply of power to the power supply system B 21 has been shut down, the RTC 39 can continue to update the calendar information.

When the on operation of the power switch section 14 is detected in the suspended state, the power supply state management section 30 controls the FET 20 by the FET control signal 35, to start the supply of power to the power supply system B 21. At the same time, the CPU unit 27' having received the resume signal 37 executes the resume processing for causing the MFP 100 to return from the suspended state, to thereby cause the MFP 100 to return to the normal state.

Figure 6:
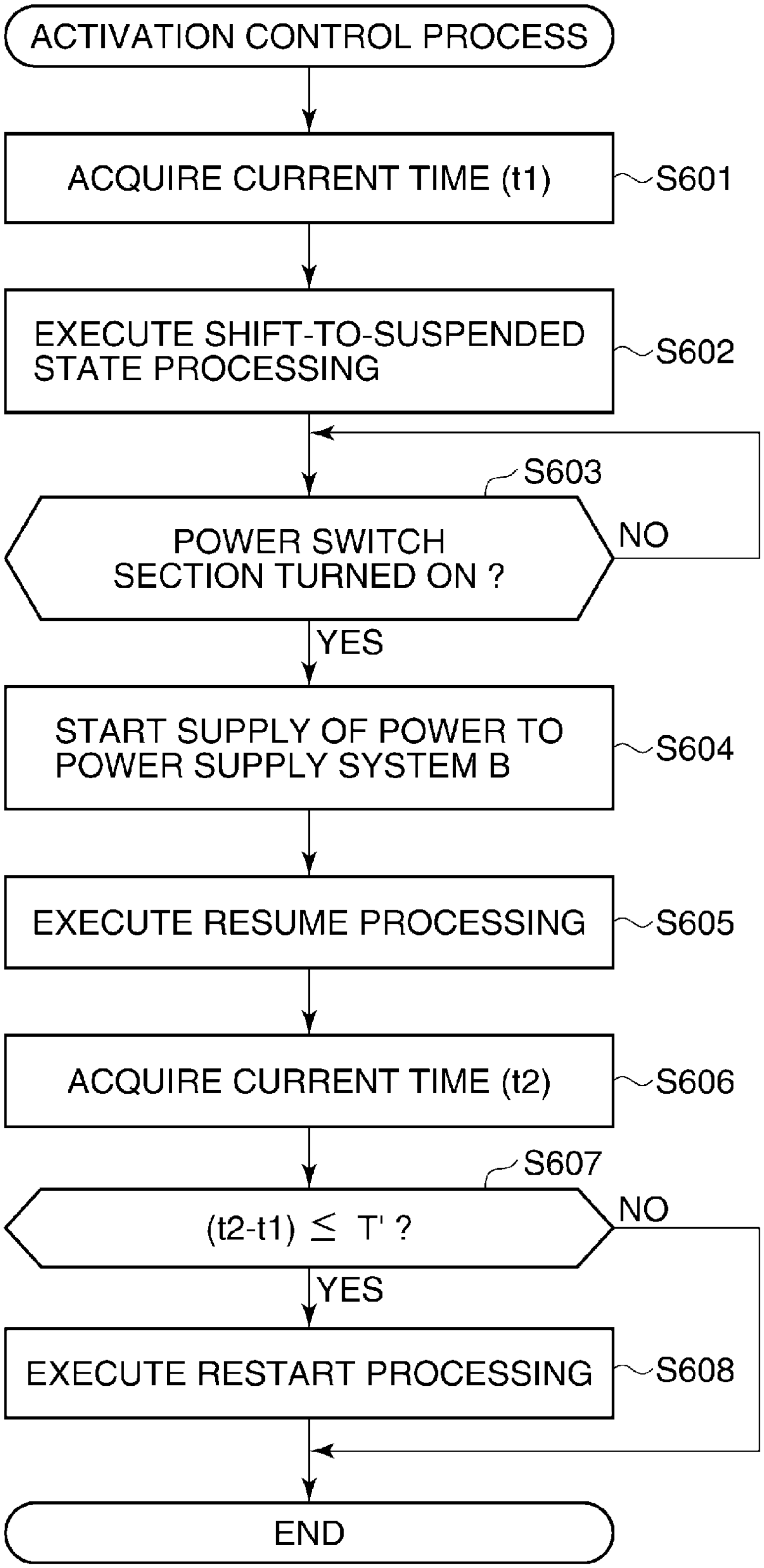
FIG. 6 is a flowchart of an activation control process executed by an MFP controller of the image forming apparatus according to the second embodiment.

FIG. 6 is a flowchart of an activation control process executed by the MFP controller 12 of the image forming apparatus according to the second embodiment.

Referring to FIG. 6, upon detection of the off operation of the power switch section 14 performed by the user, the power supply controller 23' sends the interrupt signal 34 to the CPU 42. The CPU 42 receives the interrupt signal 34 and acquires a current time t1 from the RTC 39 (step S601). This current time t1 is temporarily stored as a variable in the memory section 25. The step S601 corresponds to the operation of a first timer value-acquiring unit which acquires a current timer value as a first timer value (t1) when the off operation of the power switch section 14 is detected.

Then, the CPU unit 27' executes the shift-to-suspended state processing (step S602). After having shifted to the suspended state, the CPU unit 27' sends the suspend processing termination signal 36 to the power supply controller 23'. Upon receipt of the suspend processing termination signal 36, the power supply controller 23' cuts off the supply of power to the power supply system B 21 to shift to the suspended state, and at the same time, the CPU 42 causes the supply of power from the backup battery 43 to the RTC 39 to be started by the switch 44. Further, the memory 25 continues to store memory values (including the current time t1) in a low power state. The above-described step S602 corresponds to the operation of the shift unit that stores the first state of the image forming apparatus at the time of the detection of the off operation when the current time t1 is acquired, and then shifts the state of the image forming apparatus to the second state from which the image forming apparatus can return to the first state when the on operation of the power switch section 14 is detected. The first state corresponds to the normal state, and the second state corresponds to the suspended state. Therefore, the amount of power consumption of the image forming apparatus in the second state is smaller than the amount of power consumption of the image forming apparatus in the first state.

Upon detection of the on operation of the power switch section 14 (YES to a step S603), the power supply controller 23' starts the supply of power to the power supply system B 21 (step S604). Further, at this time, the power supply controller 23' sends the resume signal 37 to the CPU unit 27', and the CPU unit 27' executes the resume processing (step S605), whereby the MFP 100 returns from the suspended state to the normal state. After completion of the return, it is possible to refer to the current time t1 stored in the memory section 25 since the CPU 42 operates in a state substantially equivalent to the state before execution of the shift-to-suspended state processing in the step S602.

Then, the CPU 42 acquires a current time t2 from the RTC 39 immediately after the MFP 100 has returned from the suspended state (step S606). The step S606 corresponds to the operation of a second timer value-acquiring unit that acquires a current timer value as a second timer value when the on operation of the power switch has been detected, and the image forming apparatus has returned from the second state to the first state.

Then, the CPU 42 calculates the measured time value (t2−t1) (this operation corresponds to the operation of a measurement unit), which is the difference between the current time t1 acquired before execution of the shift-to-suspended state processing and the current time t2. A time period indicated by the measured time value (t2−t1) can be defined as a time period that has elapsed from the first timer value (t1) to the second timer value (t2).

The RTC 39 always continues to operate using the backup battery 43, and can acquire time as the year, month, day, hour, minute and second, and therefore the time period indicated by the measured time value (t2−t1) is acquired as a sum of a time period required for the MFP 100 to shift to the suspended state (shift-to-suspended state time)+a time period in the suspended state+a time period required for the MFP 100 to return to the normal state (resume return time).

Then, it is determined whether or not (t2−t1)≤T' holds (step S607). Here, T' represents a value corresponding to a predetermined time period, which will be described in detail hereinafter. If it is determined that (t2−t1)>T' holds (NO to the step S607), the present process is immediately terminated. After termination of the present process, the normal state continues. As described above, when the time measured time value (t2−t1) indicative of a time period elapsed from the first timer value (t1) to the second timer value (t2) is larger than the value T', the MFP 100 is not restarted, whereby the first state is continued.

On the other hand, if it is determined that (t2−t1)≤T' holds (YES to the step S607), the CPU 42 performs shutdown processing of the MFP 100, and sends a reset signal 41 to the reset section 24 to thereby execute the restart processing (step S608), followed by terminating the present process. The step S608 corresponds to the operation of a restart unit that restarts the image forming apparatus depending on the first timer value (t1) and the second timer value (t2).

Next, a description will be given of the above-mentioned value T' corresponding to the predetermined time period. The predetermined time period is a time period it takes for the MFP 100 to become capable of operating in the normal operating state when the MFP 100 is caused to return from the suspended state to the normal state.

In the second embodiment, a time period indicated by the measured time value (t2−t1) includes the shift-to-suspended state time+the resume return time, and hence as the value T' corresponding to the predetermined time period, there may be employed a fixed value corresponding to a time period which includes the sum of the shift-to-suspended state time+the resume return time as its part. Further, when the sum of the shift-to-suspended state time+the resume return time is sufficiently smaller than T', the sum of them can be ignored as well.

The value T' corresponding to the predetermined time period is different on an apparatus basis depending on various conditions, such as the hardware configuration and the software configuration of the MFP 100. Therefore, a time period it takes for the MFP 100 to become capable of operating in the normal operating state is empirically determined in advance e.g. by experiment, and the value T' corresponding to the predetermined time period is set using the empirically determined time period.

According to the activation control process shown in FIG. 6, the MFP 100 is restarted or is caused to return to the stored normal state depending on the acquired measured time value t'. Specifically, the MFP 100 is restarted or is caused to return to the stored normal state when the measured time value is not larger than the value T' corresponding to the predetermined time period.

As a consequence, when the off operation of the power switch section 14 is performed, the MFP 100 can be shifted to a state from which quick activation can be performed in a shorter time period than in cases where restart is always performed.

Further, in the present embodiment, the shutdown operation to the restart operation are performed in the step S608, so that it is possible to execute a restart method which is sound from the viewpoint of the system.

Note that in the second embodiment, the memory section 25 is included in the power supply system A 22' since the description has been given by taking an example in which the suspend method is employed, the method described in the second embodiment can be directly applied to the hibernation method.

In the hibernation method, the memory section 25 is configured to be included in the power supply system B 21. Although in the suspend method, the supply of power to the power supply system B 21 is cut off in the state of data being stored in the memory section 25, in the hibernation method, memory values stored in the memory section 25 before cutting off the supply of power to the power supply system B 21 are transferred as data to the storage device 26.

To perform the resume processing, data is transferred from the storage device 26 to the memory section 25, whereby the memory section 25 is eventually placed in the same state as the state in which the memory values continue to be stored therein, even without continuing supply of power to the memory section 25.

By adding transfer processing for transferring data to the storage device 26 to the suspend method configured as above, it is possible to perform an operation equivalent to an operation by the suspend method but delayed by a time period required to perform processing of the transfer of data to the storage device 26. That is, since the current time t1 is stored in the storage device 26, it is possible to directly apply the second embodiment to the hibernation method.

Note that in general, an ordinary CPU unit includes a RTC, and it is possible to realize the above-described second embodiment without adding costs required for new hardware to the costs of the normal CPU.

Assuming that the second embodiment is realized by such a small-scale CPU unit 27' as does not require the RTC 39, the backup battery 43 required for the RTC 39 is expensive, so that there can be employed the following method:

The method is one in which a hardware timer capable of measuring time and accessible from the CPU 42 is provided within a circuit driven by the power supply system A 22', and the activation control process shown in FIG. 6 is applied to the MFP 100. This method makes it possible to realize the second embodiment only with an increase in the cost of the timer section.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-134302, filed Jun. 16, 2011, Japanese Patent Application No. 2012-016616, filed Jan. 30, 2012, which are hereby incorporated by reference herein in their entirety.

What is claimed is:

1. An image forming apparatus, comprising:

a memory that stores instructions;

at least one processor that executes the instructions to;

execute a suspend processing to cause the image forming apparatus to shift to a power saving state in accordance with a power switch being turned off by a user's operation;

execute a resume processing to cause the image forming apparatus to return from the power saving state in accordance with the power switch being turned on by a user's operation; and execute, in accordance with the power switch being turned on by the user's operation at a time that an OFF-time period, which has elapsed in a state the power switch, having been turned off by the user's operation, is turned off, is not longer than a predetermined time period, a restart processing to restart the image forming apparatus.

2. The image forming apparatus according to claim 1, wherein the processor acquires first current time information in accordance with the power switch being turned off by the user's operation, acquires second current time information in accordance with the power switch is turned on by the user's operation, and calculates the OFF-time period based on the first current time information and the second current time information.

3. The image forming apparatus according to claim 1, wherein the processor executes a shutdown processing to shut down the image forming apparatus and then executes the restart processing, in accordance with the power switch being turned on by the user's operation at the time that the OFF-time period is not longer than the predetermined time period.

4. The image forming apparatus according to claim 1, wherein the image forming apparatus is returned, by executing the resume processing, from the power saving state to a state indicated by information stored in the memory.

5. The image forming apparatus according to claim 1, wherein the power saving state is a suspend state in which power is supplied to the memory or a hibernation state in which power is not supplied to the memory.

6. The image forming apparatus according to claim 1, wherein the power switch can be used by a user.

7. The image forming apparatus according to claim 4, wherein the processor is configured to store the information in the memory and to execute the suspend processing in accordance with the power switch being turned off by the user's operation.

8. The image forming apparatus according to claim 1, further comprising:

a reset circuit which issue a system reset of the image forming apparatus based on receiving a system reset instruction, wherein the processor outputs the system reset instruction to the reset circuit in accordance with the power switch being turned on by the user's operation at the time that the OFF-time period is not longer than the predetermined time period.

9. The image forming apparatus according to claim 2, the processor acquires the first current timer information and the second current time information from an RTC.

10. The image forming apparatus according to claim 1, wherein the processor executes resume processing and then executes the restart processing in accordance with the power switch being turned on by the user's operation at a time that the OFF-time period is not longer than the predetermined time period.

11. The image forming apparatus according to claim 1, wherein, in the restart processing, the memory is cleaned up.

12. The image forming apparatus according to claim 1, wherein a time period for executing the restart processing is longer than a time period for executing the resume processing.

13. The image forming apparatus according to claim 1, further comprising:

a timer circuit which measures the OFF-time period in the power saving state.

14. The image forming apparatus according to claim 1, wherein the processor executes, in accordance with the power switch being turned on by the user's operation at the time that the OFF-time period is not longer than the predetermined time period, the restart processing by reloading an operating system of the image forming apparatus.

15. The image forming apparatus according to claim 3, wherein the processor shuts down an operating system of the image forming apparatus in the shutdown processing.

16. The image forming apparatus according to claim 1, wherein the processor executes, in accordance with the power switch being turned on by the user's operation at the time that the OFF-time period is not longer than the predetermined time period, the restart processing by controlling to reset the image forming apparatus.

17. A method of controlling an image forming apparatus, comprising:

executing a suspend processing to cause the image forming apparatus to shift to a power saving state in accordance with a power switch being turned off by a user's operation;

executing a resume processing to cause the image forming apparatus to return from the power saying state in accordance with the power switch being turned on by a user's operation; and executing, in accordance with the power switch being turned on by the user's operation at a time that an OFF-time period, which has been elapsed in a state that the power switch, having been turned off by the user's operation, is turned off, is not longer than a predetermined time period, a restart processing to restart the image forming apparatus.

18. The method according to claim 17, further comprising:

acquiring first current time information in accordance with the power switch being turned off by the user's operation;

acquiring second current time information in accordance with the power switch being turned on by the user's operation; and calculating the OFF-time period based on the first current time information and the second current time information.

* * * * *